United States Patent
Kim et al.

(10) Patent No.: US 9,899,707 B2
(45) Date of Patent: Feb. 20, 2018

(54) ROLLING DEVICE FOR SECONDARY BATTERY

(71) Applicant: SAMSUNG SDI CO., LTD., Yongin-si, Gyeonggi-do (KR)

(72) Inventors: Kangmin Kim, Yongin-si (KR); Youngmin Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 15/292,336

(22) Filed: Oct. 13, 2016

(65) Prior Publication Data

US 2017/0125850 A1    May 4, 2017

(30) Foreign Application Priority Data

Oct. 30, 2015 (KR) .......................... 10-2015-0151949

(51) Int. Cl.

| H01M 10/0587 | (2010.01) |
| B65H 75/08 | (2006.01) |
| B65H 75/28 | (2006.01) |
| H01M 10/04 | (2006.01) |
| H01M 10/0525 | (2010.01) |

(52) U.S. Cl.
CPC ........ H01M 10/0587 (2013.01); B65H 75/08 (2013.01); B65H 75/28 (2013.01); H01M 10/0431 (2013.01); H01M 10/0525 (2013.01)

(58) Field of Classification Search
CPC ......... H01M 10/0587; H01M 10/0431; H01M 10/0525; H01M 10/0409; B65H 75/10; B65H 75/246; B65H 75/248; B65H 75/285; Y02E 60/122

See application file for complete search history.

(56) References Cited

U.S. PATENT DOCUMENTS

| 5,045,086 | A | * | 9/1991 | Juergens | ............... | H01M 2/263 |
| | | | | | | 29/623.1 |
| 9,711,820 | B2 | * | 7/2017 | Nakakuki | ......... | H01M 10/0459 |
| 2009/0130551 | A1 | * | 5/2009 | Mori | ..................... | C01B 3/0047 |
| | | | | | | 429/174 |
| 2011/0111293 | A1 | * | 5/2011 | Kogetsu | ................. | H01M 2/26 |
| | | | | | | 429/209 |
| 2012/0237809 | A1 | * | 9/2012 | Ahn | ..................... | H01M 2/263 |
| | | | | | | 429/94 |

(Continued)

FOREIGN PATENT DOCUMENTS

| JP | 2002-226092 A | 8/2002 |
| JP | 2006-318787 A | 11/2006 |
| KR | 10-2011-0042638 A | 4/2011 |

*Primary Examiner* — Emmanuel M Marcelo
(74) *Attorney, Agent, or Firm* — Lee & Morse P.C.

(57) ABSTRACT

A rolling device for a secondary battery includes a mandrel to roll a first electrode plate, a second electrode plate, and a separator interposed between the first electrode plate and the second electrode plate, the mandrel having a pair of clamps at a center of the mandrel, a blade surrounding the clamps while being spaced apart from the clamps, the blade having an elliptical cross-section and being divided into four sections, the first electrode plate, second electrode plate, and separator being rolled on the blade, and a rotating body coupled to an interior side of the blade, the rotating body being between the clamps and the blade.

13 Claims, 5 Drawing Sheets

(56) References Cited

U.S. PATENT DOCUMENTS

2012/0308863 A1* 12/2012 Masumoto ............ H01M 2/022
  429/94
2012/0321931 A1* 12/2012 Ahn ...................... H01M 2/206
  429/144
2015/0129107 A1* 5/2015 Miyazaki ................ H01M 4/04
  156/64

* cited by examiner

ROLLING DEVICE FOR SECONDARY BATTERY

CROSS-REFERENCE TO RELATED APPLICATION

Korean Patent Application No. 10-2015-0151949, filed on Oct. 30, 2015, in the Korean Intellectual Property Office, and entitled: "Rolling Device for Secondary Battery," is incorporated by reference herein in its entirety.

BACKGROUND

1. Field

The present disclosure relates to a rolling device for a secondary battery.

2. Description of the Related Art

In general, batteries are classified into primary batteries and secondary batteries. Unlike primary batteries, secondary batteries are rechargeable. The secondary batteries have come into widespread use for advanced electronic apparatuses, e.g., cellular phones, notebook computers or camcorders.

In particular, lithium secondary batteries operate at a voltage of 3.6 V and are widely used as power supplies for electronic apparatuses. Lithium secondary batteries have been increasingly and extensively researched and developed because they have operating voltages that are approximately three times higher than operating voltages of nickel-cadmium (Ni—Cd) batteries or nickel-metal hydride (Ni-MH) batteries, and have high energy density per unit weight. Such lithium secondary batteries generally use lithium oxide as a positive active material and a carbonaceous material as a negative active material. In addition, lithium secondary batteries are manufactured in various shapes, and representative examples thereof may include cylindrical batteries, prismatic batteries, and pouch-type batteries.

Generally, a lithium secondary battery includes an electrode assembly, a lithium secondary battery case which accommodates the electrode assembly, and an electrolyte solution which is inserted inside the lithium secondary battery case and allows lithium ions to move. The electrode assembly includes a positive electrode, a negative electrode, and a separator interposed between the positive electrode and the negative electrode to prevent a short therebetween and to allow an electrolyte solution or ions to move.

SUMMARY

According to an aspect of the present disclosure, there is provided a rolling device for a secondary battery, the rolling device including a mandrel to roll a first electrode plate, a second electrode plate, and a separator interposed between the first electrode plate and the second electrode plate, the mandrel having a pair of clamps at a center of the mandrel, a blade surrounding the clamps while being spaced apart from the clamps, the blade having an elliptical cross-section and being divided into four sections, the first electrode plate, second electrode plate, and separator being rolled on the blade, and a rotating body coupled to an interior side of the blade, the rotating body being between the clamps and the blade.

The blade may be divided into the four sections along a first imaginary line and a second imaginary line passing its center.

The blade may include acute first and second points at a first side and a second side of the elliptical cross-section, respectively, and a long axis connecting the first point and the second point while passing the center of the blade, and a short axis perpendicular to the long axis while passing the center of the blade.

The first imaginary line may be tilted from the long axis by a preset angle.

The second imaginary line may be tilted from the short axis by a preset angle.

The first imaginary line and the second imaginary line may be spaced apart from the first point and the second point, respectively.

The first and second imaginary lines may be tilted at an acute angle with respect to respective long and short axes of the elliptical cross-section.

The rotating body may include four rotating body sections coupled to respective ones of the divided blade sections.

The four rotating body sections with the respective blade sections may be moveable radially with respect to a center of the blade.

The rotating body may be moveable toward and away from a center of the mandrel.

The blade may be moveable toward and away from the center of the mandrel in accordance with the rotating body.

The pair of clamps may be spaced apart from each other, an end of the separator being inserted into a region between the pair of clamps.

According to another aspect of the present disclosure, there is provided a mandrel for an electrode assembly, the mandrel including a pair of clamps at a center of the mandrel, a blade surrounding the clamps while being spaced apart from the clamps, the blade having an elliptical cross-section and being divided into four sections, the first electrode plate, second electrode plate, and separator being rolled on the blade, and a rotating body coupled to an interior side of the blade, the rotating body being between the clamps and the blade.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Figure 1:
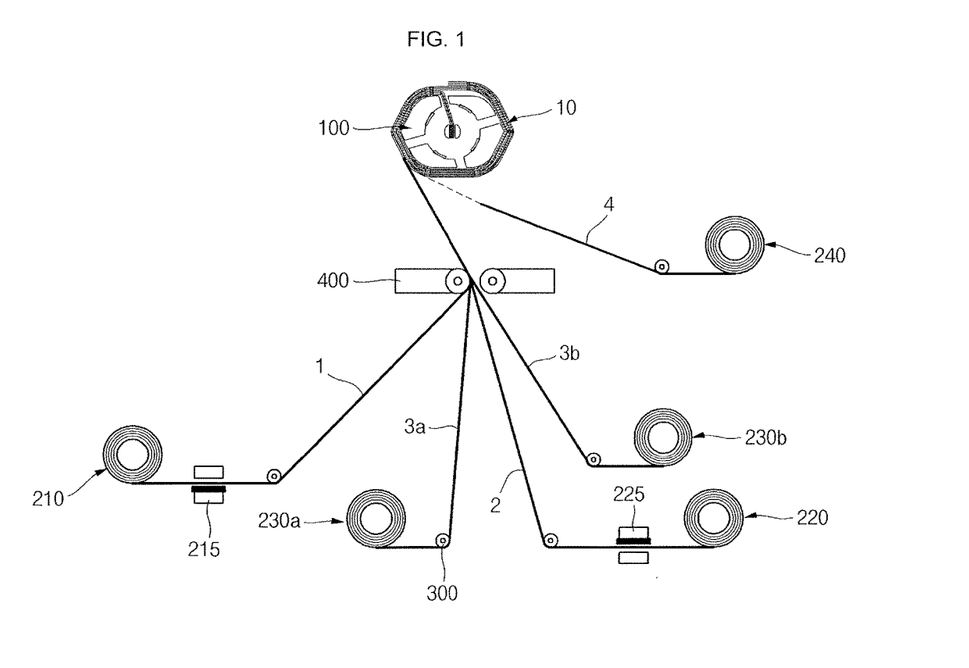
FIG. 1 illustrates a schematic view of a rolling device according to an embodiment.

Hereinafter, a rolling device according to an embodiment will be described with reference to FIG. 1. FIG. 1 is a schematic view of a rolling device according to an embodiment.

Referring to FIG. 1, the rolling device for a secondary battery according to an embodiment may include a mandrel 100, a plurality of supply units, e.g., supply units 210, 220, 230a and 230b, a fixing tape supply unit 240, transfer rollers 300, and a cutting unit 400. In the mandrel 100, a first electrode plate 1, a second electrode plate 2, and separators 3a and 3b, supplied from respective supply units 210, 220, 230a and 230b are rolled, thereby forming the electrode assembly 10.

In detail, the mandrel 100 may be rotated by a driver to roll the first electrode plate 1, the second electrode plate 2, and the separators 3a and 3b, supplied from the supply units 210, 220, 230a and 230b, respectively, in a predetermined order. A configuration of the mandrel 100 will be described in more detail below with reference to FIGS. 2-6.

Referring back to FIG. 1, the plurality of supply units, e.g., supply units 210, 220, 230a, and 230b, and the fixing tape supply unit 240 supply the first electrode plate 1, the second electrode plate 2, the separators 3a and 3b, and a fixing tape 4 to the mandrel 100, respectively. The supply units 210, 220, 230a, 230b, and the fixing tape supply unit 240 include a first electrode plate supply unit 210 on which the first electrode plate 1 is rolled, a second electrode plate supply unit 220 on which the second electrode plate 2 is rolled, first and second separator supply units 230a and 230b on which the first and second separators 3a and 3b are rolled, and the fixing tape supply unit 240 on which the fixing tape 4 is rolled.

Here, the first and second electrode plate supply units 210 and 220 and the first and second separator supply units 230a and 230b are arranged such that the first and second separator supply units 230a and 230b are interposed between the first electrode plate supply unit 210 and the second electrode plate supply unit 220. For example, as illustrated in FIG. 1, the first separator supply unit 230a may be between the first and second electrode plate supply units 210 and 220, while the second electrode plate supply unit 220 may be between the first and second separator supply units 230a and 230b. As such, the first electrode plate 1, the first separator 3a, the second electrode plate 2, and the second separator 3b from corresponding supply units may be rolled in the stated order into a jelly-roll type electrode assembly.

First and second electrode tab attaching portions 215 and 225 are installed in the first electrode plate supply unit 210 and the second electrode plate supply unit 220, respectively. The first and second electrode tab attaching portions 215 and 225 attach first and second electrode tabs to uncoated portions of the first and second electrode plates 1 and 2 unrolled from the first and second electrode plate supply units 210 and 220.

The electrode assembly 10 is formed by rolling the first and second electrode plates 1 and 2, and the first and second separators 3a and 3b, unrolled from the supply units 210, 220, 230a and 230b using the mandrel 100 in a roll configuration. That is, the electrode assembly 10 includes the first and second electrode plates 1 and 2 and the first and second separators 3a and 3b in forms of strips, which are arranged in that order and rolled in a jelly-roll type. In addition, the fixing tape 4 is adhered to the outermost surface of the electrode assembly 10 to fix the electrode assembly 10 rolled in the jelly-roll type so as to prevent the electrode assembly 10 from being unrolled.

The first electrode plate 1 may be a positive electrode and may include a first active material layer coated on both surfaces of a first electrode current collector formed of a highly conductive metal plate, e.g., an aluminum (Al) foil. A chalcogenide compound may be used as a first active material, and examples thereof may include composite metal oxides, e.g., $LiCoO_2$, $LiMn_2O_4$, $LiNiO_2$, $LiNi_{1-x}Co_xO_2$ ($0<x<1$), or $LiMnO_2$, but aspects of the present disclosure are not limited thereto.

The second electrode plate 2 may be a negative electrode and may include a second active material layer coated on both surfaces of a second electrode current collector formed of a conductive metal plate, e.g., a copper (Cu) foil or a nickel (Ni) foil. A carbon based material, Si, Sn, tin oxide, composite tin alloys, a transition metal oxide, a lithium metal nitride or a lithium metal may be used as a second active material, but aspects of the present disclosure are not limited thereto.

The first and second separators 3a and 3b may prevent a short between the first and second electrode plates 1 and 2 and may allow only charges of a lithium secondary battery, e.g., lithium ions, to move. The first and second separators 3a and 3b may include one or more of, e.g., polyethylene, polypropylene and a copolymer of polyethylene and polypropylene, but aspects of the present disclosure are not limited thereto. The first and second separators 3a and 3b preferably have larger widths than the first and second electrode plates 1 and 2, which is advantageous in preventing a short between the first and second electrode plates 1 and 2.

The transfer rollers 300 may be rotated by each rotation axis and each driver, and may guide transfer operations of the first and second electrode plates 1 and 2, the first and second separators 3a and 3b, and the fixing tape 4, which are unrolled from the respective supply units 210, 220, 230a, 230b and 240.

The cutting unit 400 cuts the first and second electrode plates 1 and 2 and the first and second separators 3a and 3b, which are unrolled from the respective supply units 210, 220, 230a and 230b, in a predetermined length to constitute the electrode assembly 10.

The operation of the rolling device in FIG. 1 will now be described.

First, the respective supply units 210, 220, 230a, and 230b unroll the first and second electrode plates 1 and 2 and the first and second separators 3a and 3b. The unrolled first and second electrode plates 1 and 2, and the unrolled first and second separators 3a and 3b are fed into the cutting unit 400 by the respective transfer rollers 300 installed at predetermined positions. The first and second electrode tabs are attached to predetermined positions of the transferred first and second electrode plates 1 and 2 by the first and second electrode tab attaching portions 215 and 225, respectively.

Accordingly, the first and second electrode plates 1 and 2, to which the first and second electrode tabs are attached, and the first and second separators 3a and 3b interposed between the first and second electrode plates 1 and 2, are inserted into clamps 110a and 110b of the mandrel 100. In addition, the first and second electrode plates 1 and 2 and the first and second separators 3a and 3b, which are inserted into the clamps 110a and 110b, are rolled on the outer surface of the mandrel 100 rotated by the driver. It is noted that the first and second separators 3a and 3b are inserted into the clamps 110a and 110b without the first and second electrode plates 1 and 2, followed by being rolled a predetermined number of turns, before the first and second electrode plates 1 and 2 are also supplied to the clamps 110a and 110b to be rolled together with the first and second separators 3a and 3b.

The first and second electrode plates 1 and 2 and the first and second separator supply units 230a and 230b, which are rolled by the mandrel 100, are cut by the cutting unit 400 to have a predetermined length. After the first and second electrode plates 1 and 2, and the first and second separators 3a and 3b are rolled, the fixing tape 4 supplied from the fixing tape supply unit 240 disposed at one side is adhered outside the rolled first and second electrode plates 1 and 2 and the rolled first and second separators 3a and 3b, thereby fixing the electrode assembly 10.

Hereinafter, the mandrel 100 in the rolling device according to an embodiment will be described with reference to FIGS. 2 to 6.

Figure 2:
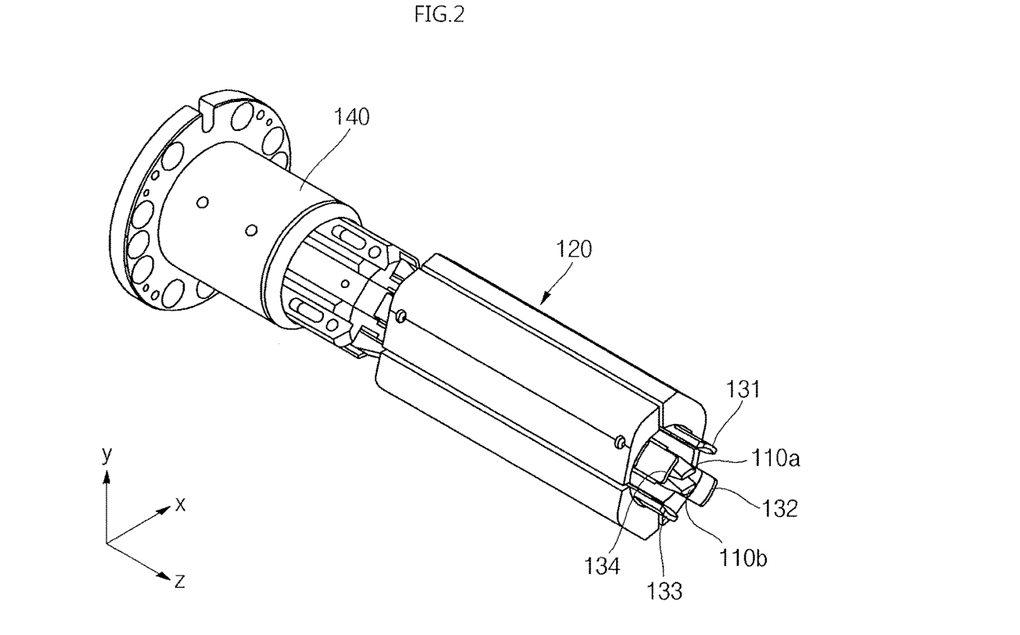
FIG. 2 illustrates a perspective view of a mandrel in the rolling device shown in FIG. 1.
Figure 3:
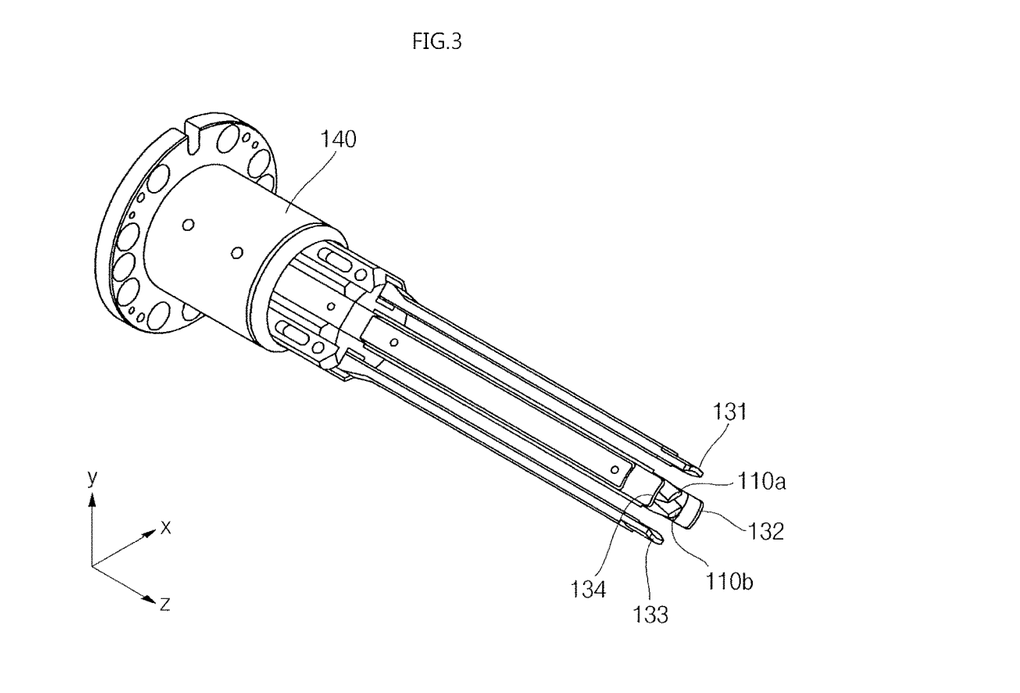
FIG. 3 illustrates a perspective view of a mandrel according to an embodiment, from which a blade is removed.
Figure 4:
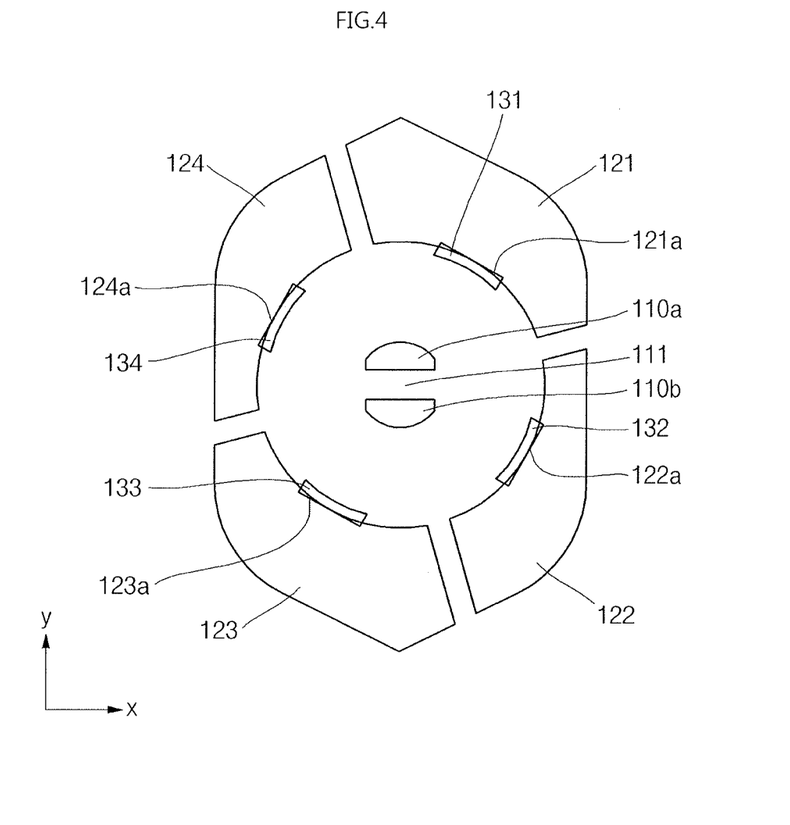
FIG. 4 illustrates a cross-sectional view of the mandrel shown in FIG. 3.
Figure 5:
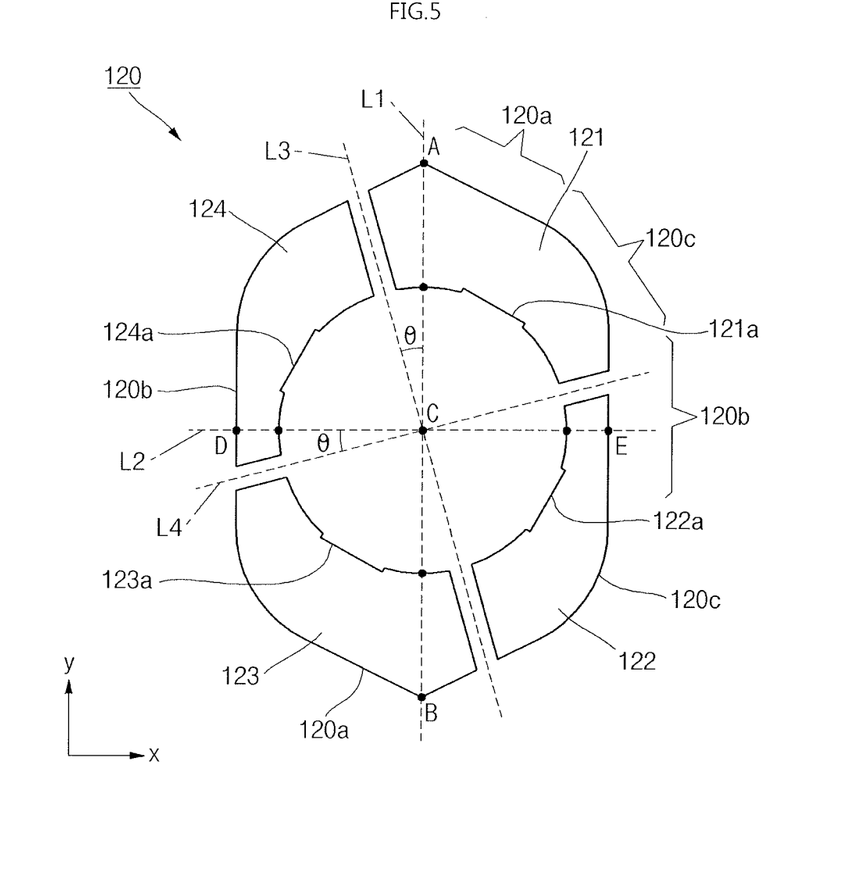
FIG. 5 illustrates a cross-sectional view of a blade in the mandrel shown in FIG. 3.
Figure 6:
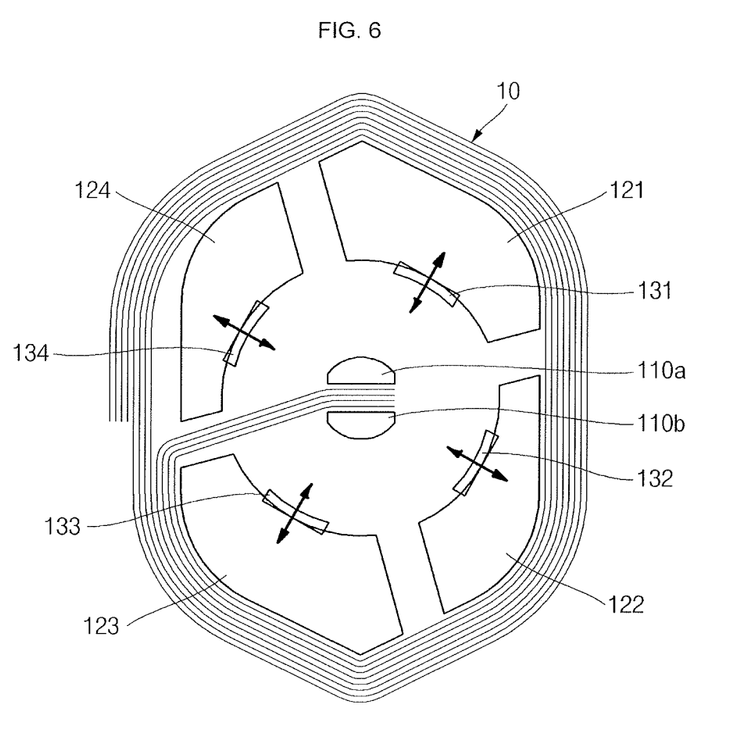
FIG. 6 illustrates a cross-sectional view of the mandrel shown in FIG. 3 and an electrode assembly rolled on the mandrel.

FIG. 2 is a perspective view of the mandrel 100, FIG. 3 is a perspective view of the mandrel 100 with the blade 120 removed therefrom, and FIG. 4 is a cross-sectional view in of the mandrel 100 along the xy-plane. FIG. 5 is a cross-sectional view of the blade 120 along the xy-plane, and FIG. 6 is a cross-sectional view of the mandrel 100 and the electrode assembly 10 rolled on the mandrel 100.

Referring to FIGS. 2 to 6, the mandrel 100 according to an embodiment may include the clamps 110a and 110b, a blade 120, rotating bodies 131, 132, 133 and 134, and a base unit 140.

In detail, the clamps 110a and 110b are positioned at the center of the mandrel 100 and first ends thereof are fixed to the base unit 140 to be described later. The clamps 110a and 110b fix an end of the electrode assembly 10. For example, the end of the electrode assembly 10 may mean ends of the first and second electrode plates 1 and 2 and ends of the first and second separators 3a and 3b. In another example, the end of the electrode assembly 10 may mean only ends of the first and second separators 3a and 3b. When only the first and second separators 3a and 3b are inserted into the clamps 110a and 110b, the first and second separators 3a and 3b are first rolled the predetermined number of turns, subsequently followed by rolling the first and second separators 3a and 3b together with the first and second electrode plates 1 and 2. In this case, only the first and second separators 3a and 3b are positioned in the innermost side of the electrode assembly 10, thereby effectively preventing the first and second electrode plates 1 and 2 from being damaged and an internal short of the electrode assembly 10.

As illustrated in FIG. 4, the clamps 110a and 110b include a first clamp 110a and a second clamp 110b spaced apart from each other, e.g., along a y-axis, around a feeding groove 111. The end of the electrode assembly 10 is inserted into the feeding groove 111 between the first clamp 110a and the second clamp 110b (FIG. 6).

A distance between the first and second clamps 110a and 110b may be adjusted by the base unit 140, thereby inserting the end of the electrode assembly 10 and fixing the same. That is, the first and second clamps 110a and 110b are made, e.g., adjusted, to be spaced apart from each other a predetermined distance, thereby defining the feeding groove 111 to facilitate insertion of the end of the electrode assembly 10. Thereafter, the first and second clamps 110a and 110b may be adjusted to be closer to each other, thereby adjusting the first and second clamps 110a and 110b to firmly secure, e.g., fix, the inserted end of the electrode assembly 10. After the rolling of the electrode assembly 10 is completed, the distance between the first and second clamps 110a and 110b may be again adjusted, e.g., increased, to have the first and second clamps 110a and 110b spaced apart from each other, thereby facilitating separation, e.g., removal, of the electrode assembly 10 from the mandrel 100.

Referring back to FIG. 2, the blade 120 is formed to surround the clamps 110a and 110b, and is spaced apart from the clamps 110a and 110b, e.g., radially (FIG. 4). For example, as illustrated in FIG. 5, a cross-section of the blade 120 in the xy-plane may be shaped as an ellipse having roughly acute first and second sides opposite each other along a long axis of the ellipse. As illustrated in FIGS. 2-4, the blade 120 is coupled to the rotating bodies 131, 132, 133 and 134, and is rotated as the rotating bodies 131, 132, 133 and 134 are rotated, e.g., simultaneously, thereby rolling the first and second electrode plates 1 and 2 and the first and second separators 3a and 3b. That is, the first and second electrode plates 1 and 2 and the first and second separators 3a and 3b are rolled on the outer surface of the blade 120 in accordance with rotation of the rotating bodies 131, 132, 133 and 134.

In more detail, referring to FIG. 5, for clarity and brevity, the acute first and second sides of the blade 120 are defined by a first point A and a second point B, respectively. In other words, a side of the blade 120 including the first point A is the first side of the blade 120, while a side of the blade 120 including the second point B is the second side of the blade 120. In addition, a line passing the first and second points A and B while passing the center C of the blade 120 is defined as a long axis L1 of the blade 120, and a line passing the center C of the blade 120 while being perpendicular to the long axis L1 is defined as a short axis L2 of the blade 120. Points of the outer surface of the blade 120 that are on the short axis L2 are defined as a third point D and a fourth point E.

As illustrated in FIG. 5, the blade 120 may be symmetrically shaped in view of the long axis L1. In addition, the blade 120 may be symmetrically shaped in view of the short axis L2.

The blade 120 includes four first surfaces 120a tilted from the first point A and the second point B to have an angle of 90° or less with respect to the long axis L1. That is, two first surfaces 120a positioned at a first side of the blade 120 meet each other at the first point A and are symmetrical with each other in view of the long axis L1. In addition, two first surfaces 120a positioned at a second side of the blade 120 meet each other at the second point B and are symmetrical with each other in view of the long axis L1. The two first surfaces 120a positioned at the first side of the blade 120 are symmetrical with the two first surfaces 120a positioned at the second side of the blade 120 with respect to the short axis L2. It is noted that the symmetry of the blade 120 and its surfaces refers to the overall shape of the blade as viewed in a cross-section before the blade 120 is divided into section.

The blade 120 includes two second surfaces 120b extending from the third point D and the fourth point E with an angle of 90° with respect to the short axis L2. That is, a first second surface 120b extends from the third point D to opposite sides so as to be symmetrical with each other in view of the short axis L2. A second second surface 120b extends from the fourth point E to opposite sides so as to be symmetrical with each other in view of the short axis L2. The respective second surfaces 120b are symmetrical with each other in view of the long axis L1 while being parallel with the long axis L1.

The blade 120 further includes four curved portions 120c connecting the first surfaces 120a and the second surfaces 120b, e.g., each curved portion 120c extends between and connects a respective first surface 120a and a corresponding second surfaces 120b (top right part of blade 120 in FIG. 5). The curved portions 120c are formed to be rounded while connecting the first and second surfaces 120a and 120b. That is, connecting portions of the first and second surfaces 120a and 120b are curved by the curved portions 120c, rather than being sharpened. As the connecting portions of the first and second surfaces 120a and 120b are curved, rather then including sharp portions, when the electrode assembly 10 is rolled, the first and second electrode plates 1 and 2 or the first and second separators 3a and 3b are prevented from being damaged.

As further illustrated in FIG. 5, the blade 120 may be divided into four sections along imaginary lines. That is, the blade 120 may be divided into a first blade 121, a second blade 122, a third blade 123, and a fourth blade 124. For example, the first through fourth blades 121 through blade 124 may be completely discrete portions separated from each other, e.g., with spaces therebetween, while being arranged into the symmetrical ellipse shape discussed previously.

In detail, a line having a preset angle θ with respect to the long axis L1 while passing the center C of the blade 120 is defined as a first imaginary line L3, and a line having a preset angle θ with respect to the short axis L2 while passing the center C of the blade 120 is defined as a second imaginary line L4, e.g., the preset angle θ of the first and second imaginary lines L3 and L4 may be a same acute angle. Here, the preset angle θ is set within a range in which the first and second points A and B are remained. That is, the first and second imaginary lines L3 and L4 are spaced apart from the first and second points A and B, respectively. In addition, the preset angle θ is set within a range in which rolling of the electrode assembly 10 may not be affected by boundary surfaces between each of the first through fourth blades 121, 122, 123 and 124. In addition, the preset angle θ is set within a range in which the end of the electrode assembly 10 may be inserted into the clamps 110a and 110b without interference.

In further detail, the blade 120 may be divided into the first blade 121, the second blade 122, the third blade 123, and the fourth blade 124 along the first and second imaginary lines L3 and L4. That is, the blade 120 is divided along the first and second imaginary lines L3 and L4 having the preset angle θ with respect to the long axis L1 and the short axis L2 to maintain the first and second points A and B corresponding to vertices of the first side and the second side of the blade 120.

Since the blade 120 has the first and second points A and B, the shape of the electrode assembly 10 wound on the blade 120 may be maintained by the opposite vertices when the electrode assembly 10 is separated from the mandrel 100. That is, the shape of the electrode assembly 10 may be fixed with respect to the opposite ends of the long axis L1, corresponding to the first and second points A and B. Therefore, deformation of the inner surface of the electrode assembly 10, e.g., roughened inner surface of the electrode assembly 10 which faces the blade 120, may be minimized. That is, the inner surface of the electrode assembly 10 is more flattened, thereby improving the quality of the electrode assembly 10.

As further illustrated in FIG. 5, a first groove 121a, a second groove 122a, a third groove 123a, and a fourth groove 124a are formed inside the first, second, third and fourth blades 121, 122, 123, and 124, respectively. That is, the first through fourth grooves 121a through 124a are formed on inner surfaces of respective first through fourth blades 121 through 124 to face the center C of the blade 120. For example, the first through fourth grooves 121a through 124a may extend along the entire length of the blade 120 in the z-axis direction. The rotating bodies 131, 132, 133 and 134, which will later be described, may be positioned in the first, second, third and fourth grooves 121a, 122a, 123a and 124a, respectively.

In detail, the rotating bodies 131, 132, 133 and 134 are positioned in grooves 121a, 122a, 123a and 124a of the first, second, third and fourth blades 121, 122, 123 and 124, respectively. That is, the rotating bodies 131, 132, 133 and 134 include a first rotating body 131 positioned in the first groove 121a of the first blade 121, a second rotating body 132 positioned in the second groove 122a of the second blade 122, a third rotating body 133 positioned in the third groove 123a of the third blade 123, and a fourth rotating body 134 positioned in the fourth groove 124a of the fourth blade 124. For example, each of the first through fourth rotating bodies 131 through 134 may fill the entirety of a corresponding groove.

First ends of the rotating bodies 131, 132, 133, and 134 are fixed to the base unit 140 to be described later. As such, the rotating bodies 131, 132, 133, and 134 are rotated together with the base unit 140, as the driver connected to the base unit 140 is driven. In addition, as the blades 121, 122, 123, and 124 are coupled to exterior sides of the rotating bodies 131, 132, 133, and 134, the blades 121, 122, 123 and 124 are concurrently rotated with the rotating bodies 131, 132, 133, and 134. As described above, the first and second electrode plates 1 and 2 and the first and second separators 3a and 3b are rolled on the outer surfaces of the blades 121, 122, 123, and 124, when the blades 121, 122, 123, and 124 are rotated, thereby constructing the electrode assembly 10.

The rotating bodies 131, 132, 133, and 134 may get close to each other or away from each other by the base unit 140. For example, referring to FIG. 6, the rotating bodies 131, 132, 133, and 134 may be moved inwardly or outwardly with respect to the center of the mandrel 100 (along the arrows direction). The blades 121, 122, 123, and 124 may also be moved inwardly or outwardly as the rotating bodies 131, 132, 133, and 134 are moved.

In more detail, before rolling the electrode assembly 10, the rotating bodies 131, 132, 133, and 134 are outwardly moved, so that distances between each of the rotating bodies 131, 132, 133, and 134 are increased. The blades 121, 122, 123, and 124 are also moved as the rotating bodies 131, 132, 133, and 134 are moved. Then, the electrode assembly 10 is rolled on outer surfaces of the blades 121, 122, 123, and 124, i.e., on an exterior surface of the mandrel 100, according to the rotation of the base unit 140 of the mandrel 100.

After the rolling of the electrode assembly 10 on the blades 121, 122, 123, and 124 is completed, the rotating bodies 131, 132, 133, and 134 are inwardly moved to get close to each other, e.g., the rotating bodies 131, 132, 133, and 134 are moved towards the center of the blade 120 (toward the clamps 110a and 110b) along the arrows direction. Since the blades 121, 122, 123, and 124 are also moved together with the rotating bodies 131, 132, 133 and 134, the outer surfaces of the blades 121, 122, 123 and 124 are separated from the interior side of the electrode assembly 10, e.g., the outer surfaces of the blades 121, 122, 123 and 124 become spaced apart from the interior side of the electrode assembly 10 (see space between the fourth blade 124 and the electrode assembly 10 in FIG. 6). Therefore, when the mandrel 100 is moved backward to remove the wound electrode assembly 10, the interior of the electrode assembly 10 may be easily removed without damage. e.g., it is possible to prevent the interior side of the electrode assembly 10 from being brought into close contact with the blades 121, 122, 123 and 124 and then slipped out, which is referred to as an end-part slip phenomenon.

In detail, the mandrel 100 according to the present disclosure is configured in a four-divisional structure including four blades, i.e., first through fourth blades 121 through 124, corresponding to four rotating bodies, i.e., first through fourth rotating bodies 131 through 134. As such, when the four blades and rotating bodies of the mandrel 100 are moved inwardly or outwardly with respect to a center of the mandrel 100, the overall horizontal and vertical distances of the four-divisional mandrel 100 are larger, e.g., as compared to those of a two-divisional mandrel. That is, in a case of the four-divisional mandrel 100, differences between top-and-down positions and between left-and-right positions of respective rotating bodies when moved inwardly and then outwardly are increased, e.g., as compared to the two-divisional mandrel. Therefore, the increased distances can effectively prevent interference between the blades 121, 122, 123 and 124 and the interior side of the electrode assembly 10 during withdrawal of the electrode assembly 10 from the mandrel 100. That is, the end-part slip phenomenon, i.e., when an end part of an electrode assembly slips out together with a backwardly moving mandrel, may be substantially minimized or prevented.

As described above, when the electrode assembly 10 is withdrawn from the mandrel 100, the clamps 110a and 110b are moved away from each other. Therefore, the fixed end of the electrode assembly 10 may be separated from the clamps 110a and 110b.

The clamps 110a and 110b and first ends of the rotating bodies 131, 132, 133 and 134 are fixed to the base unit 140.

The driver is connected to the base unit 140 to rotate the mandrel 100. That is, as the base unit 140 is rotated, the clamps 110a and 110b and the rotating bodies 131, 132, 133 and 134 are rotated together. In addition, the base unit 140 allows the clamps 110a and 110b and the rotating bodies 131, 132, 133 and 134 to be moved by the driver.

The clamps 110a and 110b and second ends of the rotating bodies 131, 132, 133 and 134 are formed to protrude beyond the blade 120, e.g., along the z-direction (FIG. 2). The protruding clamps 110a and 110b and the protruding second ends of the rotating bodies 131, 132, 133 and 134 are fixed to a fixing unit, thereby minimizing vibration of the mandrel 100 during rotation.

Table 1 below shows a comparison result for occurrence of end-part slip when a two-divisional mandrel and a four-divisional mandrel are employed. A separator causing deformation, e.g., end-part slip, was employed as the separator in the electrode assembly in the comparison result of Table 1. In addition, the electrode assembly was configured such that only the separator was rolled a predetermined number of turns on the innermost part of the electrode assembly. The occurrence of end-part slip was determined using each 122 electrode assemblies fabricated by employing two-divisional mandrels and four-divisional mandrels.

TABLE 1

|  | 2-divisional mandrel | 4-divisional mandrel |
| --- | --- | --- |
| Occurrence of end-part slip | o | x |

A total of 122 electrode assemblies were rolled and then separated from respective mandrels. As reported in Table 1 above, the end-part slip phenomenon, i.e., that the separator slipped out with the mandrel, occurred in the two-divisional mandrel, but not in the four-divisional mandrel. Therefore, in the rolling device according to the present disclosure, which includes the four-divisional mandrel, four rotating bodies, and four blades, occurrence of the end-part slip phenomenon was substantially minimized or prevented.

For example, when the mandrel employs elliptical blades according to embodiments, no deformation occurs in two rolled electrode assemblies. That is, surfaces of the two electrode assemblies rolled one (1) to nine (9) turns are flat surfaces without creases. In contrast, if the mandrel were to employ circular blades, deformation could occur to the two electrode assemblies. For example, surfaces of electrode assemblies rolled one (1) to nine (9) turns could be not flat and could include creases. Therefore, since the rolling device according to the present disclosure employs elliptical blades, the first and second electrode plates and the separator constituting the electrode assembly are prevented from being roughened, e.g., creased or lined, thereby improving the quality of the electrode assembly.

By way of summation and review, embodiments provide a rolling device for a secondary battery, which can fabricate an electrode assembly having improved quality by employing a mandrel with an elliptical blade, where the elliptical blade includes four separate blades with four corresponding rotating bodies. That is, as described above, the rolling device for a secondary battery according to embodiments includes a mandrel with an elliptical blade having a four-divisional mandrel structure including four blades and four rotating bodies.

Since the shape of the electrode assembly is fixed with respect to the opposite ends of the long axis of the elliptical blade, occurrence of deformation, e.g., creasing in the inner surface of the electrode assembly, may be prevented or substantially minimized. In addition, since the electrode assembly is rolled using elliptical blades, occurrence of deformation may be minimized even after the electrode assembly separated from the mandrel is compressed. Further, since the mandrel includes rotating bodies and blades configured in a four-divisional structure, the horizontal and vertical distances of the four-divisional mandrel are increased when the rotating bodies are moved inwardly or outwardly, thereby minimizing the end-part slip phenomenon when the electrode assembly is separated from the mandrel. Therefore, the rolling device for a secondary battery according to the present disclosure can fabricate an electrode assembly having improved quality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rolling device for a secondary battery, the rolling device comprising:
    a mandrel to roll a first electrode plate, a second electrode plate, and a separator interposed between the first electrode plate and the second electrode plate,
    wherein the mandrel includes:
        a pair of clamps at a center of the mandrel,
        a blade surrounding the clamps while being spaced apart from the clamps, the blade having an elliptical cross-section and being divided into four sections, the first electrode plate, second electrode plate, and separator being rolled on the blade, and
        a rotating body coupled to an interior side of the blade, the rotating body being between the clamps and the blade.

2. The rolling device as claimed in claim 1, wherein the blade is divided into the four sections along a first imaginary line and a second imaginary line passing its center.

3. The rolling device as claimed in claim 2, wherein the blade includes:
    acute first and second points at a first side and a second side of the elliptical cross-section, respectively, and
    a long axis connecting the first point and the second point while passing the center of the blade, and a short axis perpendicular to the long axis while passing the center of the blade.

4. The rolling device as claimed in claim 2, wherein the first and second imaginary lines are tilted at an acute angle with respect to respective long and short axes of the elliptical cross-section.

5. The rolling device as claimed in claim 3, wherein the first imaginary line is tilted from the long axis by a preset angle.

6. The rolling device as claimed in claim 3, wherein the second imaginary line is tilted from the short axis by a preset angle.

7. The rolling device as claimed in claim 3, wherein the first imaginary line and the second imaginary line are spaced apart from the first point and the second point, respectively.

8. The rolling device as claimed in claim 1, wherein the rotating body includes four rotating body sections coupled to respective ones of the divided blade sections.

9. The rolling device as claimed in claim 8, wherein the four rotating body sections with the respective blade sections are moveable radially with respect to a center of the blade.

10. The rolling device as claimed in claim 1, wherein the rotating body is moveable toward and away from a center of the mandrel.

11. The rolling device as claimed in claim 10, wherein the blade is moveable toward and away from the center of the mandrel in accordance with the rotating body.

12. The rolling device as claimed in claim 1, wherein the pair of clamps are spaced apart from each other, an end of the separator being inserted into a region between the pair of clamps.

13. A mandrel to roll an electrode assembly, the mandrel comprising:
    a pair of clamps at a center of the mandrel;
    a blade surrounding the clamps while being spaced apart from the clamps, the blade having an elliptical cross-section and being divided into four sections, the electrode assembly to be rolled on the blade; and
    a rotating body coupled to an interior side of the blade, the rotating body being between the clamps and the blade.

* * * * *